United States Patent
House et al.

(10) Patent No.: US 12,053,117 B1
(45) Date of Patent: Aug. 6, 2024

(54) SYSTEMS, METHODS, AND DEVICES, FOR PARALLEL EXTRACTION OF BEVERAGES

(71) Applicant: Starbucks Corporation, Seattle, WA (US)

(72) Inventors: Matthew D. House, Seattle, WA (US); Kieran A. Murphy, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/313,151

(22) Filed: May 5, 2023

(51) Int. Cl.
*A47J 31/44* (2006.01)
*A47J 31/30* (2006.01)
*A47J 31/52* (2006.01)

(52) U.S. Cl.
CPC ......... *A47J 31/5255* (2018.08); *A47J 31/303* (2013.01); *A47J 31/4489* (2013.01); *A47J 31/5251* (2018.08)

(58) Field of Classification Search
CPC . A23F 5/24; A23F 5/26; A47J 31/5255; A47J 31/5251; A47J 31/303; A47J 31/4489; A47J 31/106; A47J 31/12; A47J 31/20; A47J 31/34
USPC ............................... 99/275, 283, 300; 222/1
See application file for complete search history.

(56) References Cited

U.S. PATENT DOCUMENTS

| | | | | |
|---|---|---|---|---|
| 5,992,300 | A * | 11/1999 | Fukushima | A47J 31/408 99/302 R |
| 7,810,426 | B2 * | 10/2010 | Balkau | A47J 31/4489 141/70 |
| 2007/0131797 | A1 * | 6/2007 | Balkau | A47J 31/4489 239/418 |
| 2013/0220137 | A1 * | 8/2013 | Bombeck | A47J 31/54 99/287 |
| 2015/0265092 | A1 * | 9/2015 | Baba | A47J 31/106 99/283 |
| 2017/0027370 | A1 * | 2/2017 | James | A47J 31/12 |
| 2017/0055764 | A1 * | 3/2017 | Weber | A47J 31/4489 |
| 2019/0357719 | A1 * | 11/2019 | James | A47J 31/20 |
| 2023/0111068 | A1 * | 4/2023 | Altoè | A47J 31/4485 99/275 |

* cited by examiner

*Primary Examiner* — Charles P. Cheyney
(74) *Attorney, Agent, or Firm* — Knobbe, Martens, Olson & Bear, LLP

(57) ABSTRACT

The disclosure generally relates to a beverage dispensing system for parallel beverage extraction. The beverage dispensing system may include two brew chambers configured to both prepare beverage components at the same time. The beverage dispensing system may include two dispensing points configured to simultaneously dispense beverage components prepared by a first brew chamber and a second brew chamber. In some embodiments, a beverage dispensing system configured to prepare beverage components in one brew chamber can be modified to include one or more components, features, and/or functionalities from the beverage dispensing system for parallel beverage extraction.

8 Claims, 7 Drawing Sheets

SYSTEMS, METHODS, AND DEVICES, FOR PARALLEL EXTRACTION OF BEVERAGES

FIELD

The present disclosure relates to systems, methods, and devices, for preparing and/or dispensing beverage components of a beverage order, such as, in certain embodiments, systems for parallel or simultaneous extraction and/or dispensing of beverage components.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

In some embodiments, a method for increasing throughput of a beverage dispensing machine may include modifying one or more features, functionalities, and/or components of a beverage dispensing system of the beverage dispensing machine to increase a number of brew chambers the beverage dispensing system can simultaneously prepare beverage components in, wherein modifying one or more features, functionalities, and/or components includes one or more of the following: adding a flow restrictor to a connection between a boiler system and brew chambers of the beverage dispensing system; adding a second expansion chamber to the beverage dispensing system, wherein the beverage dispensing system includes a first expansion chamber; adding a first flow meter to a connection between the boiler system and a first brew chamber, and a second flow meter to a connection between the boiler system and a second brew chamber; adding an expansion valve to the beverage dispensing system; modifying a size of one or more openings of the boiler system and/or the brew chambers; modifying a dispensing point of the beverage dispensing system to include a first dispensing point and a second dispensing point, and adding a valve configured to control the first dispensing point and the second dispensing point.

In some embodiments, modifying one or more features, functionalities, and/or components of the beverage dispensing system may include modifying one or more features, functionalities and/or components of the boiler system so the boiler system is configured to simultaneously provide an extraction medium to the first brew chamber and the second brew chamber.

In some embodiments, the boiler system may be configured to provide the extraction medium to the first brew chamber and the second brew chamber at a pressure, and modifying one or more features of the beverage dispensing system may include modifying one or more features, functionalities, and/or components of the boiler system so a controller of the beverage dispensing system is configured to independently control a first pressure of the extraction medium provided to the first brew chamber, and a second pressure of the extraction medium provided to the second brew chamber.

In some embodiments, the beverage dispensing machine may include one or more machine components that do not include the beverage dispensing system, and the method may include modifying one or more features, functionalities, and/or components of the one or more machine components to decrease a time required for the one or more machine components to perform a beverage preparation function.

In some embodiments, modifying one or more features, functionalities, and/or components of the one or more machine components may include increasing a diameter of a steam wand of the beverage dispensing machine, and increasing a steam pressure of the steam wand.

In some embodiments, the beverage dispensing machine may include a coffee dispensing machine and/or an espresso dispensing machine.

In some embodiments, a kit for increasing throughput of a beverage dispensing machine may include one or more components, wherein a beverage dispensing system of the beverage dispensing machine is modified using the one or more components to increase a number of brew chambers the beverage dispensing machine can simultaneously prepare beverage components in.

In some embodiments, the one or more components may include one or more of the following: a flow restrictor, an expansion chamber, at least one flow meter, and a valve.

In some embodiments, the flow restrictor may added to a connection between a boiler system and brew chambers of the beverage dispensing system; wherein the expansion chamber includes a second expansion chamber, and the beverage dispensing system includes a first expansion chamber, and the second expansion chamber is added to the beverage dispensing system; wherein a first flow meter of the at least one flow meter is added to a connection between the boiler system and a first brew chamber of the brew chambers, and a second flow meter of the at least one flow meter is added to a connection between the boiler system and a second brew chamber of the brew chambers; and/or wherein a dispensing point of the beverage dispensing system is modified to include a first dispensing point and a second dispensing point, and the valve is added to the beverage dispensing system, wherein the valve is configured to control the first dispensing point and the second dispensing point.

In some embodiments, the one or more components may be configured to modify one or more features and/or components of a boiler system of the beverage dispensing system so the boiler system is configured to simultaneously provide an extraction medium to a first brew chamber of the brew chambers and a second brew chamber of the brew chambers.

In some embodiments, the one or more components may be configured to modify one or more features, functionalities, and/or components of the boiler system so a controller of the beverage dispensing system is configured to independently control a first pressure of the extraction medium provided to the first brew chamber, and a second pressure of the extraction medium provided to the second brew chamber.

In some embodiments, the one or more components may be configured to modify one or more features, functionalities, and/or components of one or more machine components of the beverage dispensing machine to decrease a time required for the one or more machine components to perform a beverage preparation function, wherein the machine components do not include the beverage dispensing system.

In some embodiments, the one or more components may include a first steam wand including a first diameter, and the beverage dispensing machine includes a second steam wand including a second diameter, wherein the first diameter is larger than the second diameter, and wherein the first steam wand is configured to replace the second steam wand, and wherein a pressure of water supplied to the first steam wand is increased from a pressure of waster supplied to the second steam wand.

In some embodiments, a beverage dispensing machine may include a first beverage dispensing system configured to prepare a beverage ingredient in only one brew chamber, wherein the first beverage dispensing system is modified to include a second beverage dispensing system including: a first brew chamber configured to prepare a first beverage component; a second brew chamber configured to prepare a second beverage component; and a boiler system configured to provide an extraction medium to the first brew chamber and the second brew chamber, wherein the first brew chamber and the second brew chamber are configured to prepare the first beverage component and the second beverage component simultaneously; a control system including: a communication module configured to receive a beverage order including one or more beverage components, wherein the one or more beverage components include the first beverage component and/or the second beverage component; and a controller configured to communicate instructions for preparing the one or more beverage components to the beverage dispensing system.

In some embodiments, the instructions may include a beverage order queue including a sequence of one or more beverage components.

In some embodiments, the beverage order queue includes a first beverage order queue may include a first sequence of one or more beverage components for the first brew chamber to prepare and a second beverage order queue including a second sequence of one or more beverage components for the second brew chamber to prepare.

In some embodiments, the first sequence of one or more beverage components and the second sequence of one or more beverage components may include a combined beverage component, wherein the combined beverage component includes the first beverage component and the second beverage components.

In some embodiments, a beverage dispensing machine may include a user interface configured to display the beverage queue.

In some embodiments, the user interface may be a first user interface, and the beverage dispensing machine may include a second user interface configured to display a status of the first beverage component and/or the second beverage component.

In some embodiments, the beverage dispensing machine may include a first dispensing point and a second dispensing point, wherein the first dispensing point and the second dispensing point are in fluid communication with the first brew chamber and the second brew chamber, and wherein the first dispensing point and the second dispensing point are configured to dispense the first beverage component and/or the second beverage component.

In some embodiments, the first dispensing point and the second dispensing point may be configured to dispense the first beverage component and the second beverage component into a beverage container and/or the first dispensing point is configured to dispense the first beverage component into a first beverage container and the second dispensing point is configured to dispense the second beverage component into a second beverage container.

In some embodiments, the beverage dispensing machine may be a coffee dispensing machine and/or an espresso dispensing machine.

In some embodiments, a method for increasing throughput of a beverage dispensing machine may include identifying a beverage dispensing machine comprising multiple flow paths, wherein the multiple flow paths cannot operate simultaneously, and modifying one or more features, functionalities, and/or components of the beverage dispensing machine so the multiple flow paths can operate simultaneously.

BRIEF DESCRIPTION OF THE DRAWINGS

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

Figure 1A:
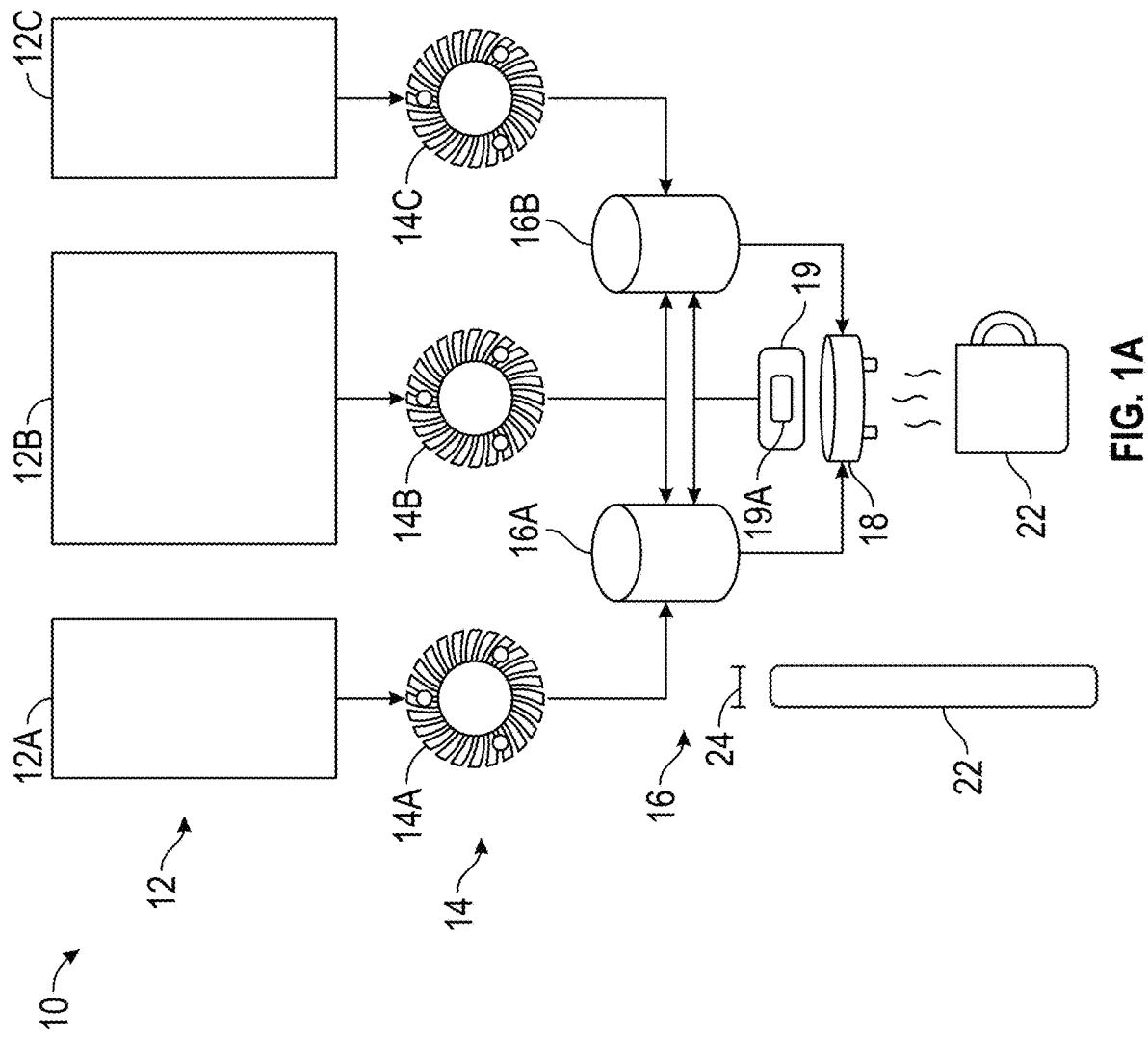
FIG. 1A illustrates a schematic of a system for beverage extraction.

Although several embodiments, examples, and illustrations are disclosed below, it will be understood by those of ordinary skill in the art that the system, methods, and devices described herein extend beyond the specifically disclosed embodiments, examples, and illustrations and includes other uses of the system, methods, and devices and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing the system, methods, and devices herein described.

At high volume coffee stores, changes in preparation times for beverage components (e.g., espresso shots) can significantly affect the time required to prepare beverages and the potential throughput of beverages. High volume coffee stores may have automated or semi-automated beverage dispensing machines that can prepare and/or dispense beverage components with a higher throughput than manual beverage dispensing machines typically used by smaller coffee stores or consumers.

Typically, the automated or semi-automated beverage dispensing machines include multiple brewing chambers, but are configured to only prepare beverage components with one brewing chamber at a time. The automated beverage dispensing machine may be able to prepare and/or dispense beverage components at a high enough throughput at times of the day when few customers are ordering beverages. However, the automated beverage dispensing machine may not be able to prepare and/or dispense beverage components at a high enough throughput at the busiest times of the day with a higher volume of beverage orders from customers. Not having a high enough throughput can lead to long lines and increased wait times for customers at the busiest times of the day, when customers are typically in a rush (i.e., commuting to work in the morning).

The automated beverage dispensing machines can be replaced with higher throughput beverage dispensing machines, however, automated beverage dispensing machines can be costly, and cafés may have to spend significant amounts of money to replace the automated beverage dispensing machines at thousands of locations. Additionally, the automated beverage dispensing machines or components of the automated beverage dispensing machines may not be useful for smaller coffee stores or consumers and may be thrown out leading significant waste with a negative environmental impact.

In accordance with several embodiments, the systems described herein advantageously increase the throughput of automated beverage dispensing machines. The systems for parallel beverage extraction include beverage dispensing systems configured to prepare beverage components in multiple brew chambers simultaneously increasing the number of beverage components beverage dispensing machines can prepare at a time. Automated beverage dispensers with dispensing systems configured to prepare beverage components in one brew chamber at a time may be modified or retrofit with the system for parallel beverage extraction, thereby reducing the cost, waste and environmental impact of increasing the potential throughput of beverage dispensing machines at thousands of café locations.

FIG. 1A shows a schematic of a system 10 for beverage extraction. The system 10 may be configured to only prepare and/or dispense one beverage component at a time. The system 10 may include hoppers 12, grinders 14, brew chambers 16 and/or dispensing points 18. The system 10 may include a first hopper 12A, a second hopper 12B, and/or a third hopper 12C. The system 10 may include a first grinder 14A, a second grinder 14B, and/or a third grinder 14C. The system 10 may include a first brew chamber 16A and/or a second brew chamber 16B.

In some embodiments, each of the hoppers 12 may be configured to hold a beverage ingredient. In some embodiments, as described further below, the beverage ingredient may include an edible substance and may also be, in whole or in part (e.g., ground). In some embodiments, each of the hoppers 12 may be configured to hold the same beverage ingredient or one or more of the hoppers 12 may be configured to hold a different ingredient.

In some embodiments, the hoppers 12 may be coupled to the grinders 14 so the hoppers 12 may transfer or transport beverage ingredients to the grinders 14. The first hopper 12A may be coupled to the first grinder 14A, the second hopper 12B may be coupled to the second grinder 14B, and/or the third hopper 12C may be coupled to the third grinder 14C.

In some embodiments, the grinders 14 may be configured to grind and/or crush the beverage ingredients from a whole configuration (e.g., whole coffee beans) to a ground configuration (e.g., ground coffee) to produce ground beverage ingredients. The grinders 14 may be coupled to or connected to the brew chambers 16 so the grinders 14 may transfer or transport the ground beverage ingredients to the brew chambers 16.

In some embodiments, the brew chambers 16 may extract, brew, or otherwise prepare beverage components from ground beverage ingredients. The first brew chamber 16A and the second brew chamber 16B may be configured so only one of the first brew chamber 16A and the second brew chamber 16B may extract, brew, or otherwise prepare a beverage component at a time.

In some embodiments, a boiler system 19 may be configured to provide an extraction medium (e.g., water) to the brew chambers 16. The boiler system 19 may be configured to provide the extraction medium to the first brew chamber 16A or the second brew chamber 16B so one of the first brew chamber 16A and the second brew chamber 16B may extract, brew, or otherwise prepare a beverage component. In some embodiments, the boiler system 19 may include one expansion chamber 19A configured to pressurize the extraction medium when the extraction medium is provided to the first brew chamber 16A or the second brew chamber 16B.

Figure 1B:
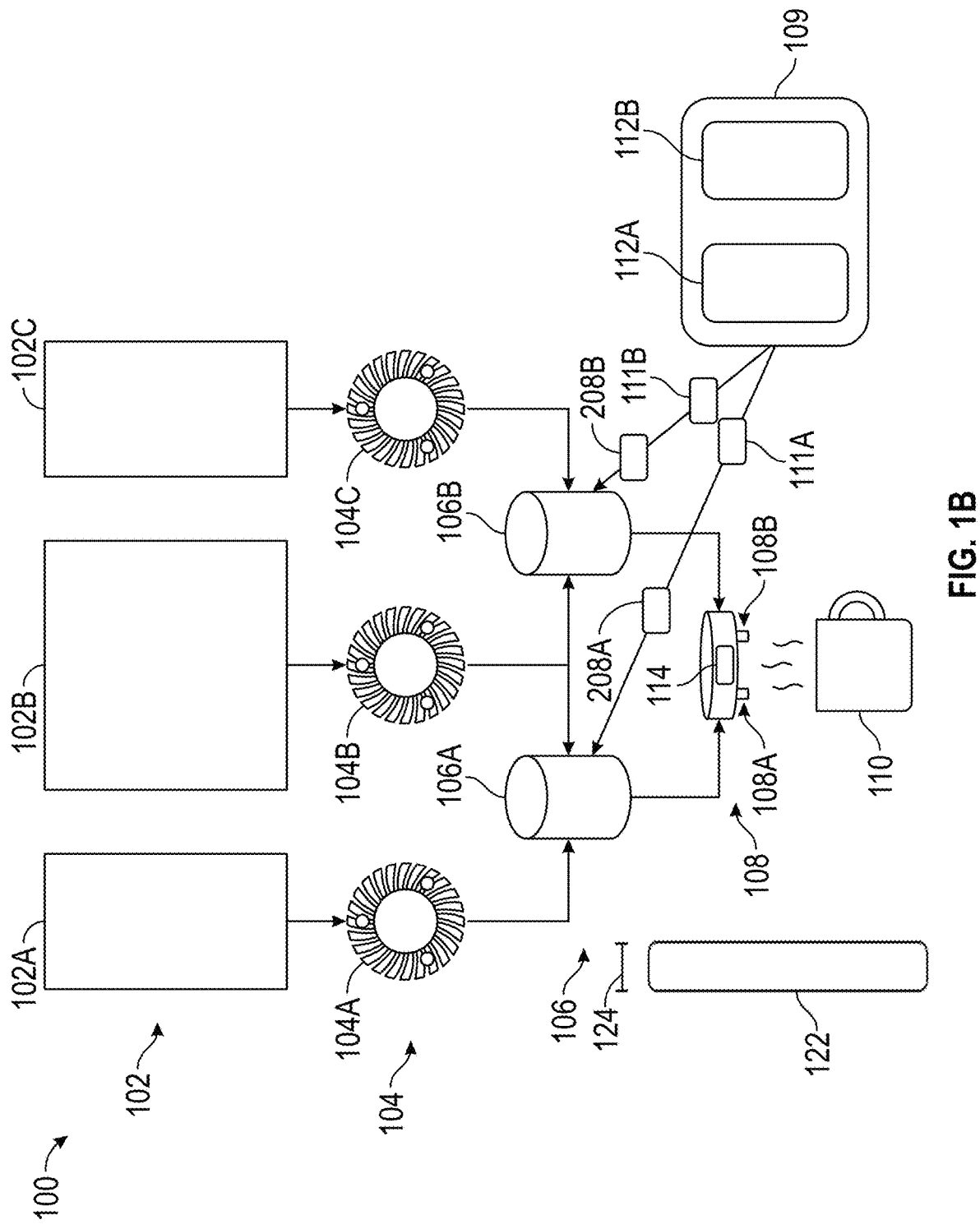
FIG. 1B illustrates a schematic of a system for parallel beverage extraction.

In some embodiments, the brew chambers 16 may be coupled to or connected to the dispensing point 18 so the beverage components prepared by the first brew chamber 16A or the second brew chamber 16B may be dispensed into a beverage container 22. The first brew chamber 16A and the second brew chamber 16B may be in fluid communication with the dispensing point 18. FIG. 1B shows a schematic of a system 100 for parallel beverage extraction. In some embodiments, as described further below, the system 10 may be modified or retrofit to include one or more one or more functions, features, and/or components of the system 100 described herein. The system 100 may include hoppers 102, grinders 104, brew chambers 106, and/or dispensing points 108. The system 100 may include a first hopper 102A, a second hopper 102B, and/or a third hopper 102C. The system 100 may include a first grinder 104A, a second grinder 104B, and/or a third grinder 104C. The system 100 may include a first brew chamber 106A and/or a second brew chamber 106B. The system 100 may include a first dispensing point 108A and/or a second dispensing point 108B.

In some embodiments, each of the hoppers 102 may be configured to hold a beverage ingredient. In some embodiments, the beverage ingredient may include an edible substance and may also be, in whole or in part (e.g., ground), at least one of green coffee cherries, red coffee cherries, white coffee, roasted coffee beans, unroasted coffee beans, espresso coffee, coffee flowers, coffee cherry pulp, coffee cherry stalk, coffee cherry exocarp, or coffee cherry mesocarp. However, it should be appreciated that certain features and aspects of the embodiments disclosed herein may be applicable to other beverages besides coffee extracts, such as teas and other similar infusions. For example, in yet other embodiments, the beverage ingredient may be green tea leaves and/or partially or totally dehydrated tea leaves. In still further embodiments, the extraction medium may comprise fruits, nuts, or similar plant matter including vanilla beans, chocolate beans, hazelnuts, almond, macadamia, peanut, cinnamon, mint, apple, apricot, aromatic bitters, banana, blackberry, blueberry, celery, cherry, cranberry, strawberry, raspberry, juniper berry, brandy, cachaca, carrot, citrus, lemon, lime, orange, grapefruit, tangerine, coconut, menthol, ginger, licorice, milk, pecan, pistachio, walnut, peach, pear, pepper, among others. Thus, the description herein is not limited to espresso, coffee, coffee products, tea or tea products.

In some embodiments, each of the hoppers 102 may be configured to hold the same beverage ingredient. For example, each of the first hopper 102A, the second hopper 102B, and the third hopper 102C may include whole coffee beans. In some embodiments, each of the hoppers 102 may be configured to hold a different beverage ingredient. For example, the first hopper 102A may include first whole coffee beans (e.g., a light roast), the second hopper 102B may include second whole coffee beans (e.g., a medium roast), and the third hopper 102B may include third whole coffee beans (e.g., a dark roast). In some embodiments, two of the hoppers 102 may be configured to hold the same beverage, and one of the hoppers 102 may be configured to hold a different beverage ingredient. For example, the first hopper 102A and the third hopper 102C may each include the first whole coffee beans (e.g., the light roast) and the second hopper 102B may include the second whole coffee beans (e.g., the medium roast).

In some embodiments, the hoppers 102 may be coupled to the grinders 104. The first hopper 102A may be coupled to the first grinder 104A, the second hopper 102B may be coupled to the second grinder 104B, and/or the third hopper 102C may be coupled to the third grinder 104C.

In some embodiments, the hoppers 102 may be configured to transfer or transport the beverage ingredients in the hoppers 102 to the grinders 104. The first hopper 102A may transfer the beverage ingredient in the first hopper 102A to the first grinder 104A, the second hopper 102B may transfer the beverage ingredient in the second hopper 102B to the second grinder 104B, and/or the third hopper 102C may transfer the beverage ingredient in the third hopper 102C to the third grinder 104C. In some embodiments, the hoppers 102 may transfer a particular amount of the beverage ingredients to the grinders 104. The particular amount of the beverage ingredients may be determined based on a beverage order.

In some embodiments, the grinders 104 may be configured to receive the beverage ingredients from the hoppers 102. The grinders 104 may be configured to grind and/or crush the beverage ingredients from a whole configuration (e.g., whole coffee beans) to a ground configuration (e.g., ground coffee) to produce ground beverage ingredients. In some embodiments, the grinders 104 may be configured to grind and/or crush the beverage ingredients to a particular size. The particular may be based on a particular beverage ingredient received by a grinder 104, a beverage order, and/or a beverage made from the particular beverage ingredient received by the grinder 104. In some embodiments, the grinders 104 may be configured to automatically and dynamically adjust a grind size of the grinders 104 to grind and/or crush the beverage ingredients to the particular size based on a beverage order, as. In some embodiments, the grinders 104 may include a blade grinder, a conical burr grinder, a flat burr grinder, and/or any other type of grinder.

In some embodiments, the grinders 104 may be coupled to or connected to the brew chambers 106. The first grinder 104A may be coupled to or connected to the first brew chamber 106A. The second grinder 104B may be coupled to or connected to the first brew chamber 106A and the second brew chamber 106B. The third grinder 104C may be coupled to or connected to the second brew chamber 106B.

In some embodiments, the grinders 104 may be configured to transfer or transport the ground beverage ingredients to the brew chambers 106. The first grinder 104A may be configured to transfer ground beverage ingredients to the first brew chamber 106A. The second grinder 104B may be configured to transfer ground beverage ingredients to the first brew chamber 106A and the second brew chamber 106B. The third grinder 104C may be configured to transfer ground beverage ingredients to the second brew chamber 106B.

In some embodiments, the brew chambers 106 may extract, brew, or otherwise prepare beverage components from ground beverage ingredients. In some embodiments, the system 100 may be configured so the brew chambers 106 may extract, brew, or otherwise prepare beverage components in parallel (i.e., at the same time). The brew chambers 106 may be configured to independently prepare beverage components. The first brew chamber 106A may be configured to prepare a first beverage component and the second brew chamber 106B may be configured to prepare a second beverage component. In some embodiments, the first brew chamber 106A may be configured to prepare at least a portion of the first beverage component at a same time as the second brew chamber 106B prepares at least a portion of the second beverage component. In some embodiments, the first brew chamber 106A and the second brew chamber 106B may be configured to prepare the first beverage component and the second beverage components simultaneously so the first beverage component and the second beverage component are brewed at the same time. In some embodiments, the first beverage component and the second beverage component may include components of the same beverage or the first beverage component and the second beverage component may include components of different beverages.

In some embodiments, the beverage components prepared by the brew chambers 106 may include a size. The size of the beverage components may include a volume of about 0.5 fl oz, about 1.0 fl oz, about 1.5 fl oz, about 2.0 fl oz, about 2.5 fl oz, about 3.0 fl oz, about 3.5 fl oz, about 4.0 fl oz, about 4.5 fl oz, about 5.0 fl oz, about 6.0 fl oz, about 7.0 fl oz, about 8.0 fl oz, about 9.0 fl oz, about 10.0 fl oz, and/or any value between the aforementioned values. In some embodiments, the size of the beverage components may include a volume between about 0.5 fl oz and about 6.0 fl oz. In some embodiments, the size of the beverage components may include a volume between about 1 fl oz and about 2 fl oz.

In some embodiments, the brew chambers 106 may be sized and/or shaped to prepare multiple doses or portions of the beverage components. The brew chambers 106 may be sized and/or shaped to prepare any of a single dose (1 dose), a double dose (2 doses), a triple dose (3 doses), and/or a quad dose (4 doses). In some embodiments, each of the first brew chamber 106A and the second chamber 106B may be configured to prepare up to the double dose, the triple dose, and/or the quad dose. In some embodiments, the first brew chamber 106A and the second brew chamber 106B may be configured to each prepare up to the double dose and may in combination, prepare up to the quad dose.

In some embodiments, a boiler system 109 may be configured to provide an extraction medium (e.g., water) to the brew chambers 106. In some embodiments, the boiler system 109 may be configured to provide the extraction medium to the first brew chamber 106A and the second brew chamber 106B so one boiler system 109 can be used to provide water to both the first brew chamber 106A and the second brew chamber 106B. In some embodiments, a volume of the extraction medium provided by the boiler system 109 to the first brew chamber 106A and/or the second brew chamber 106B.

In some embodiments, the extraction medium may be forced into and/or through the brew chambers 106 to prepare the beverage components. In some embodiments, the extraction medium may be forced into and/or through the brew chambers 106 at a pressure. In some embodiments, the pressure may include a pressure of about 1 bar, about 2 bar, about 3 bar, about 4 bar, about 5 bar, about 6 bar, about 7 bar, about 8 bar, about 9 bar, about 10 bar, about 11 bar, about 12 bar, about 13 bar, about 14 bar, about 15 bar, and/or any value between the aforementioned values. In some embodiments, the pressure may be between about 1 bar and about 15 bar. In some embodiments, the pressure may be between about 5 bar and about 12 bar. In some embodiments, the pressure may be between about 8 bar and about 12 bar.

In some embodiments, in order to maintain the pressure when the boiler system 109 provides the extraction medium to both the first brew chamber 106A and the second brew chamber 106B, the system 100 may include a flow restrictor 111. The flow restrictor 111 may be positioned downstream from the boiler system 109, so the flow restrictor 111 is positioned at a connection (i.e., a pipe, a tube, etc.) between boiler system 109 and the brew chambers 106. In some embodiments, the system 100 may include two flow restrictors 111. A first flow restrictor 111A may be positioned at a connection between the boiler system 109 and the first brew chamber 106A, and a second flow restrictor 111B may be positioned at a connection between the boiler system 109 and the second brew chamber 106B.

In some embodiments, in order to maintain and/or control the pressure when the boiler system 109 provides the extraction medium to both the first brew chamber 106A and the second brew chamber 106B, the boiler system 109 may include a first expansion chamber 112A and a second expansion chamber 112B. The first expansion chamber 112A may be configured to pressurize the extraction medium provided to the first brew chamber 106A, and the second expansion chamber 112B may be configured to pressurize the extraction medium provided to the second brew chamber 106B. The pressure of the extraction medium forced into and/or through the first brew chamber 106A may be maintained and/or controlled separately from the pressure of the extraction medium forced into and/or through the second brew chamber 106B.

In some embodiments, the boiler system 109, the first expansion chamber 112A, and/or the second expansion chamber 112B may include an expansion valve. The expansion valve may maintain or limit the pressure of the extraction medium in the system 100 below a pressure threshold.

In some embodiments, the brew chambers 106 may be coupled to or connected to the dispensing points 108 so the beverage components prepared by the brew chambers 106 may be dispensed into a beverage container 110. The brew chamber 106 may be in fluid communication with the dispensing points 108. In some embodiments, the first brew chamber 106A may be in fluid communication with the first dispensing point 108A so the first dispensing point 108A may dispense the first beverage component prepared by the first brew chamber 106A, and the second brew chamber 106B may be in fluid communication with the second dispensing point 108B so the second dispensing point 108A may dispense the second beverage component prepared by the second brew chamber 106B.

In some embodiments, the first brew chamber 106A may be in fluid communication with the first dispensing point 108A and the second dispensing point 108B so the first beverage component may be dispensed by the first dispensing point 108A and the second dispensing point 108B at the same time if a second beverage component is not prepared by the second brew chamber 106B. In some embodiments, the second brew chamber 106B may be in fluid communication with the first dispensing point 108A and the second dispensing point 108B so the first beverage components may be dispensed by the first dispensing point 108A and the second dispensing point 108B at the same time if a first beverage component is not prepared by the first brew chamber 106A.

In some embodiments, the system 100 may include a valve 114 configured to open and/or close a connection between the first brew chamber 106A and the dispensing points 108 and a connection between the second brew chamber 106A and the dispensing points 108. The valve 114 may be configured to open and/or close so the first dispensing point 108A and/or the second dispensing point 108B may dispense the first beverage component prepared by the first brew chamber 106A. The valve 114 may be configured to open and/or close so the first dispensing point 108A and/or the second dispensing point 108B may dispense the second beverage component prepared by the second brew chamber 106B.

In some embodiments, a controller 204, as described below with reference to FIG. 2, may be configured to determine whether to dispense the first beverage component and/or the second beverage component via one or both of the first dispense point 108A and the second dispense point 108B. In some embodiments, controller 204 may be configured control or provide instructions to the valve 114 in order to dispense the first beverage component and/or the second beverage component via one or both of the first dispense point 108A and the second dispense point 108B.

In some embodiments, the first dispensing point 108A and the second dispensing point 108B may be positioned so the first dispensing point 108A and the second dispensing point 108B can dispense beverage components into a same beverage container 110 and/or two different beverage containers 110. In some embodiments, the first dispensing point 108A and the second dispensing point 108B may be positioned a distance from each other. In some embodiments, the distance may include a distance of about 0.50 inches, about 0.75 inches, about 1.00 inches, about 1.25 inches, about 1.50 inches, about 1.75 inches, about 2.00 inches, about 2.25 inches, about 2.50 inches, and/or any value between the aforementioned values. In some embodiments, the distance may include a distance between about 0.50 inches and about 2.50 inches. In some embodiments, the distance may include a distance between about 1.00 inches and about 2.00 inches.

In some embodiments, the dispensing points 108 may be configured to dispense at least of portion of the beverage components at the same time as the brew chambers 106 prepare the beverage components (i.e., the dispensing points 108 dispense the beverage components as the beverage components are prepared). In some embodiments, the dispensing point 108 may be configured to dispense the beverage components after the brew chambers 106 prepare the beverage components (i.e., once the entire beverage components are prepared).

Figure 2:
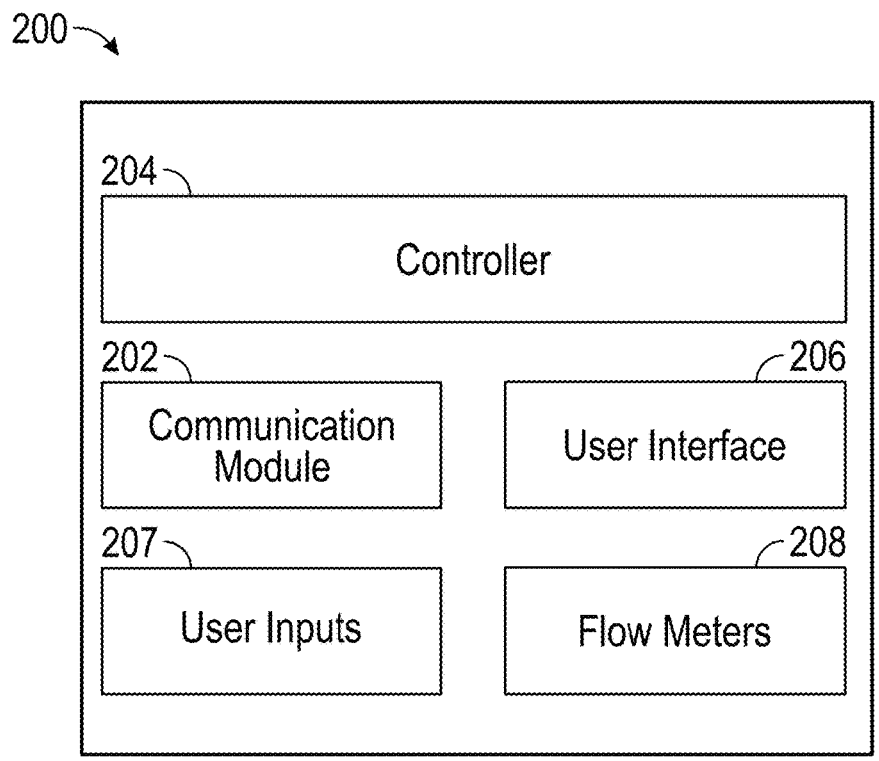
FIG. 2 illustrates a schematic of a control system for the system for parallel beverage extraction of FIG. 1B.

In some embodiments, the system 100 may include a control system 200, as shown in FIG. 2. The control system 200 may include a communication module 202, the controller 204, and a user interface 206. In some embodiments, as described further below, the user interface 206 may receive one or more beverages orders via one or more user inputs 207. The beverage orders may include one or more beverage components.

The controller 204 can control any of the functions of the system 100 as described above with reference to FIG. 1B. The controller 204 can provide instructions to the hoppers 102 to transfer or transport beverage ingredients to the grinders 104. The controller 204 can modify the grind size of the grinders 104 and/or provide instruction to the grinders 104 to grind and/or crush the beverage ingredients. The controller 204 can provide instructions to the grinders 104 to transfer or transport ground beverage ingredients to the brew chambers 106. The controller 204 can provide instructions to the brew chambers 106 to prepare a beverage ingredient. The controller 204 can provide instructions to the boiler system to provide extraction medium to the brew chambers

106. The controller 204 can provide instructions to the valve 114 and/or the dispensing points 108 to dispense beverage components prepared by the brew chambers 106.

Figure 3:
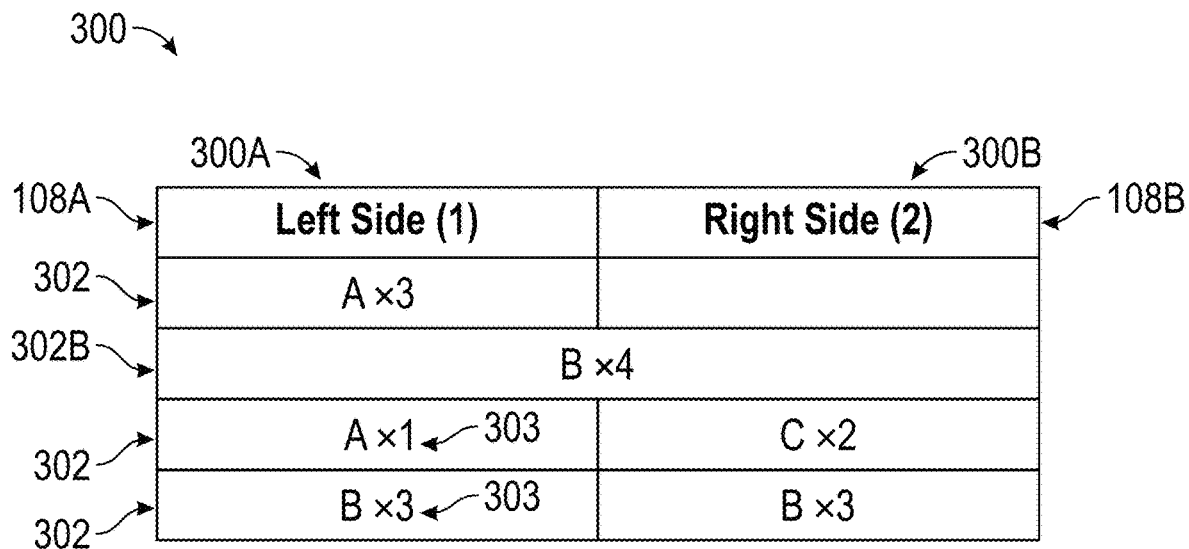
FIG. 3 illustrates a schematic of a beverage queue of the system for parallel beverage extraction of FIG. 1B.

In some embodiments, the controller 204 may be configured to determine a beverage queue 300, shown in FIG. 3, based on one or more beverage orders received by the communication module 202 and/or the user interface 206. The beverage queue 300 may include a sequence of beverage components 302 for the system 100 to prepare and dispenser. The controller 204 may determine the beverage queue 300 by adding beverage components 302 to the beverage queue 300 when the communication module 202 and/or the user interface 206 receive a beverage order. In some embodiments, the controller 204 may add a beverage component to the beverage queue 300 based on the beverage ingredient used to make a particular beverage component 302, which of the plurality of hoppers 102 includes the beverage ingredient, a size of the of the particular beverage component 302, a number of doses 303 of the particular beverage component 302 in a beverage order, and/or a current beverage queue 300. The controller 204 may add beverage components 302 of a beverage order to the beverage queue 300 in a particular sequence that may reduce or minimize a time for the system 100 to dispense the entire beverage queue 300. In some embodiments, the controller 204 may add beverage components 302 to the beverage queue 300 in a particular sequence that may reduce or minimize a time for the system 100 to dispense the beverage components 302 of the beverage order.

In some embodiments, the beverage queue 300 may include a first beverage queue 300A and a second beverage queue 300B. The first beverage queue 300A may include a beverage queue 300 for the first dispensing point 108A and/or the first brew chamber 106A. The second beverage queue 300B may include a beverage queue 300 for the second dispensing point 108B and/or the second brew chamber 106B.

In some embodiments, a beverage order may include a number of doses 303 of a beverage component 302 greater than a number of doses 303 one brew chamber 106 of the brew chambers 106 can prepare. For example, the first brew chamber 106A and the second brew chamber 106B may each be configured to prepare one dose (i.e., a single) or two doses (i.e., a double) of a beverage component 302 and the beverage order may include four doses (i.e., a quad) of the beverage component 302. The controller 204 may add the beverage component 302 to the first beverage queue 300A and the second beverage queue 300B so the first brew chamber 106A and the second brew chamber 106B prepare each of the number of doses 303 of the beverage component 302 of the beverage order, as shown by beverage component 302B.

In some embodiments, the control system 200 may include flow meters 208. The flow meters 208 may be positioned so the flow meters 208 may detect or measure a flow rate and/or pressure of the extraction medium provided to the brew chambers 106 from the boiler system 109. In some embodiments, the control system 200 may include a flow meter 208 for each of the brew chambers 106. The control system 200 may include a first flow meter 208A for the extraction medium provided to the first brew chamber 106A and a second flow meter 208B for the extraction medium provided to the second brew chamber 106B so the controller 204 can independently control the flow rate or pressure of the extraction medium provided to each of the brew chambers 106.

In some embodiments, the flow meters 208 may transmit a signal that correlates to a flow rate and/or a pressure of the extraction medium such that the system 100 can detect or measure a flow rate and/or pressure of the extraction medium provided by the boiler system 109 to the first brew chamber 106A and the second brew chamber 106B. The flow meters 208 may transmit the signal that can be indicative of a flow rate and/or pressure of the extraction medium to the controller 204. The flow meters 208 may transmit the signal that may be used to indicate the flow rate and/or the pressure of the extraction medium in real time or substantially real time. In some embodiments, may transmit the signal that may be used to indicate the flow rate and/or the pressure of the extraction medium to the controller 204 via a wireless or a wired connection. The flow meters 208 may create a feedback loop with the controller 204. In some embodiments, the controller 204 may modify or adjust the flow rate and/or the pressure of the extraction medium provided to the first brew chamber 106A and/or the second brew chamber 106B based on the signal received from the flow meters 208.

Figure 4A:
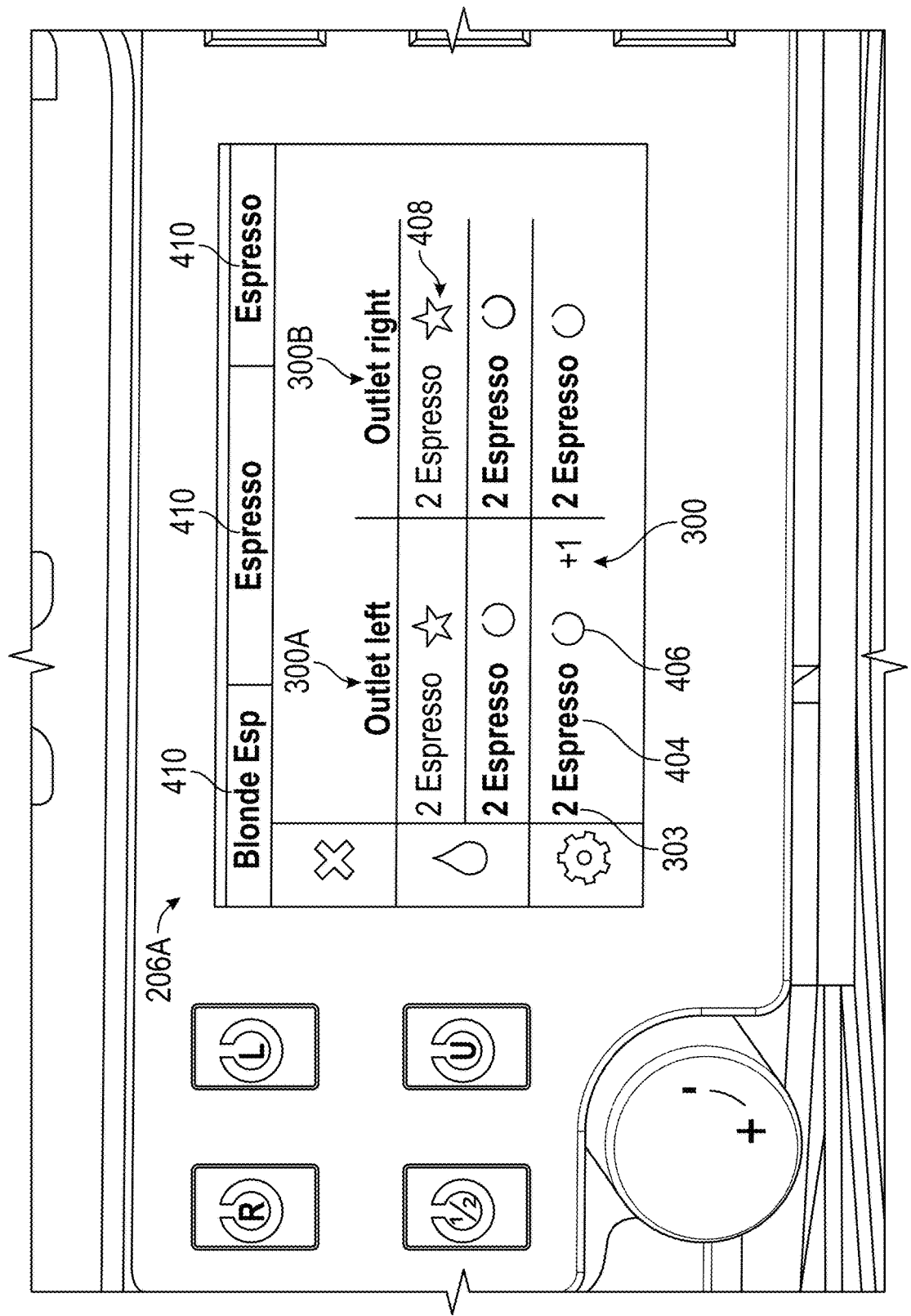
FIGS. 4A and 4B illustrate a first user interface of the control system of FIG. 2.
Figure 4B:
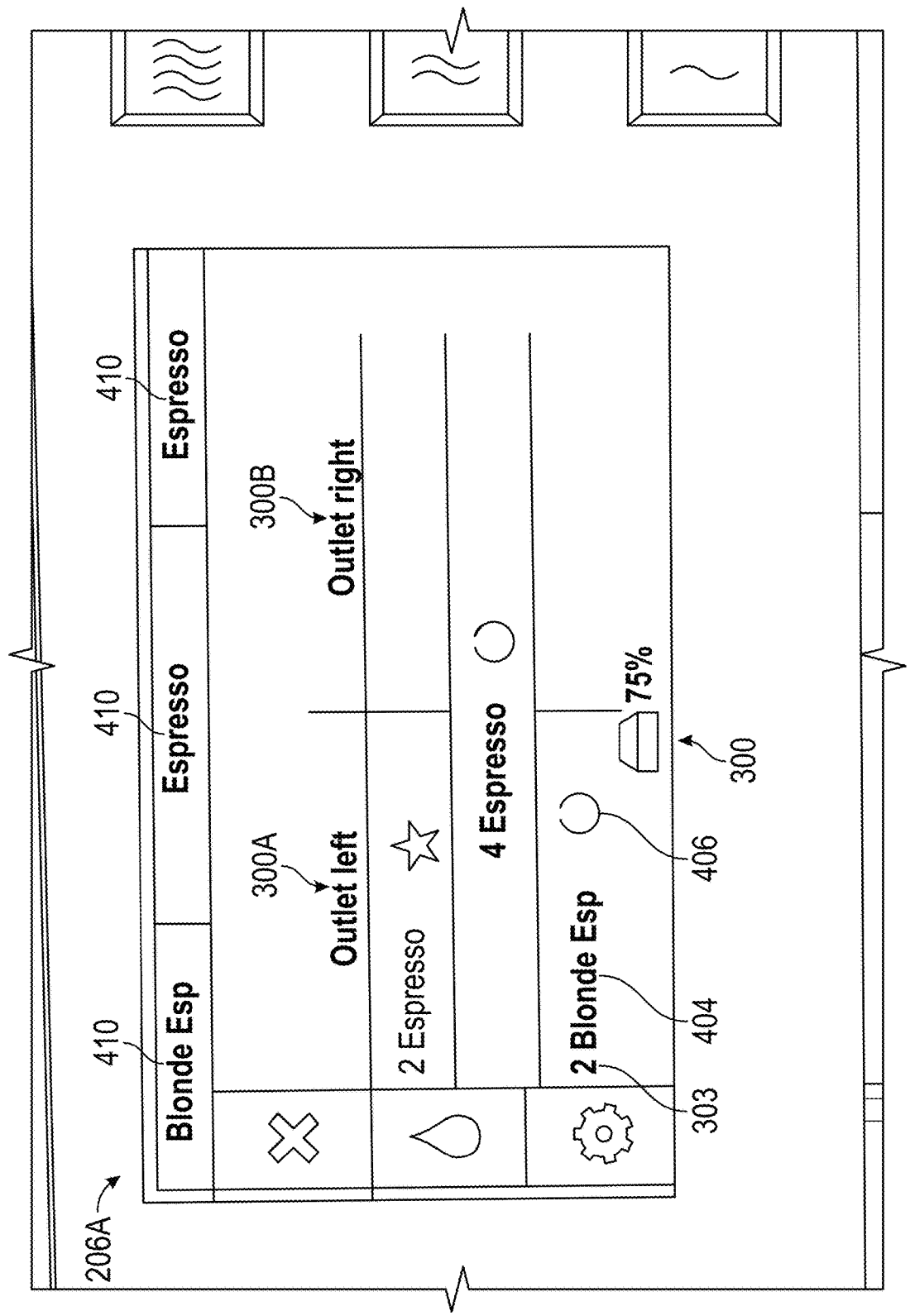
Figure 5A:
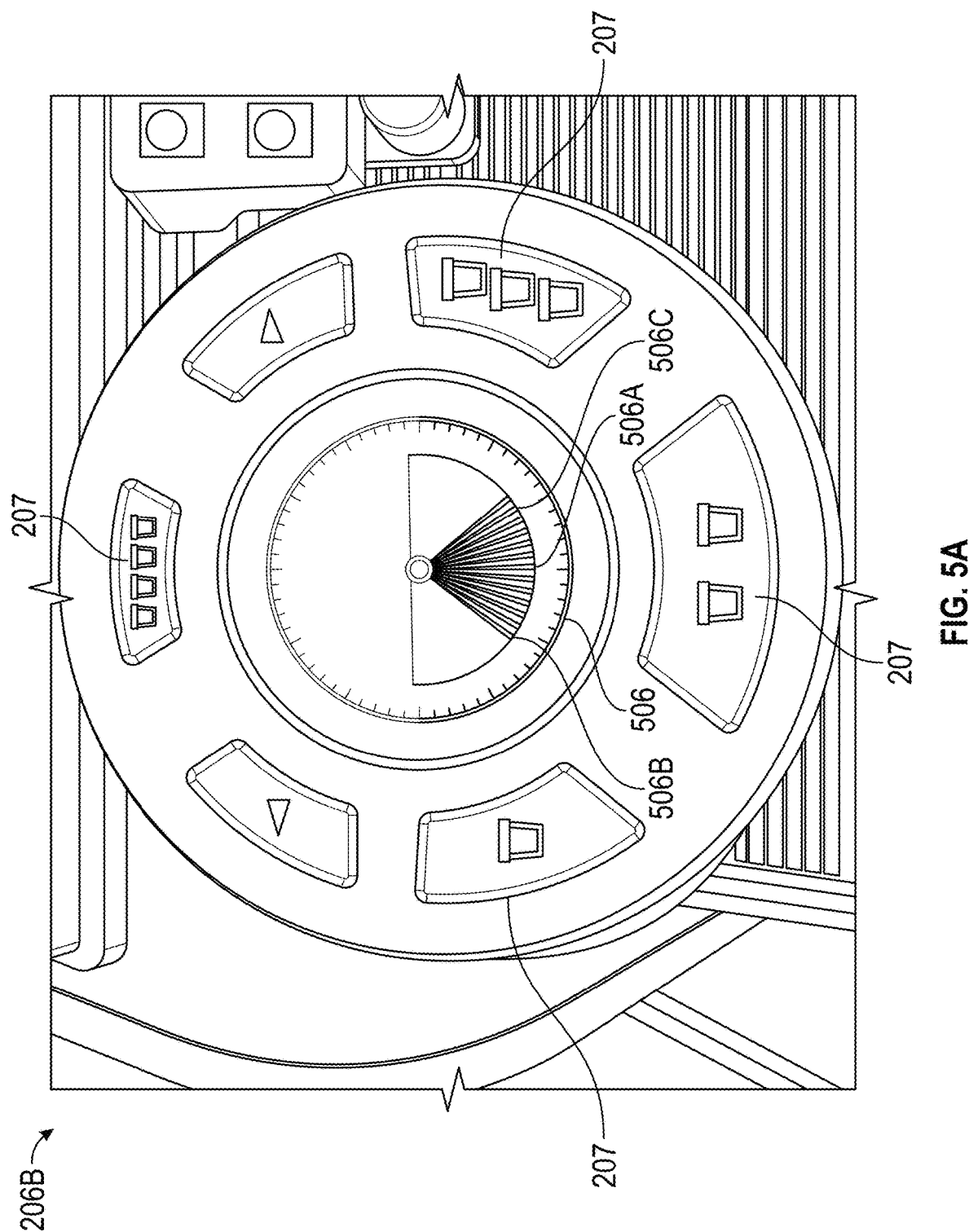
FIGS. 5A and 5B illustrate a second user interface of the control system of FIG. 2.
Figure 5B:
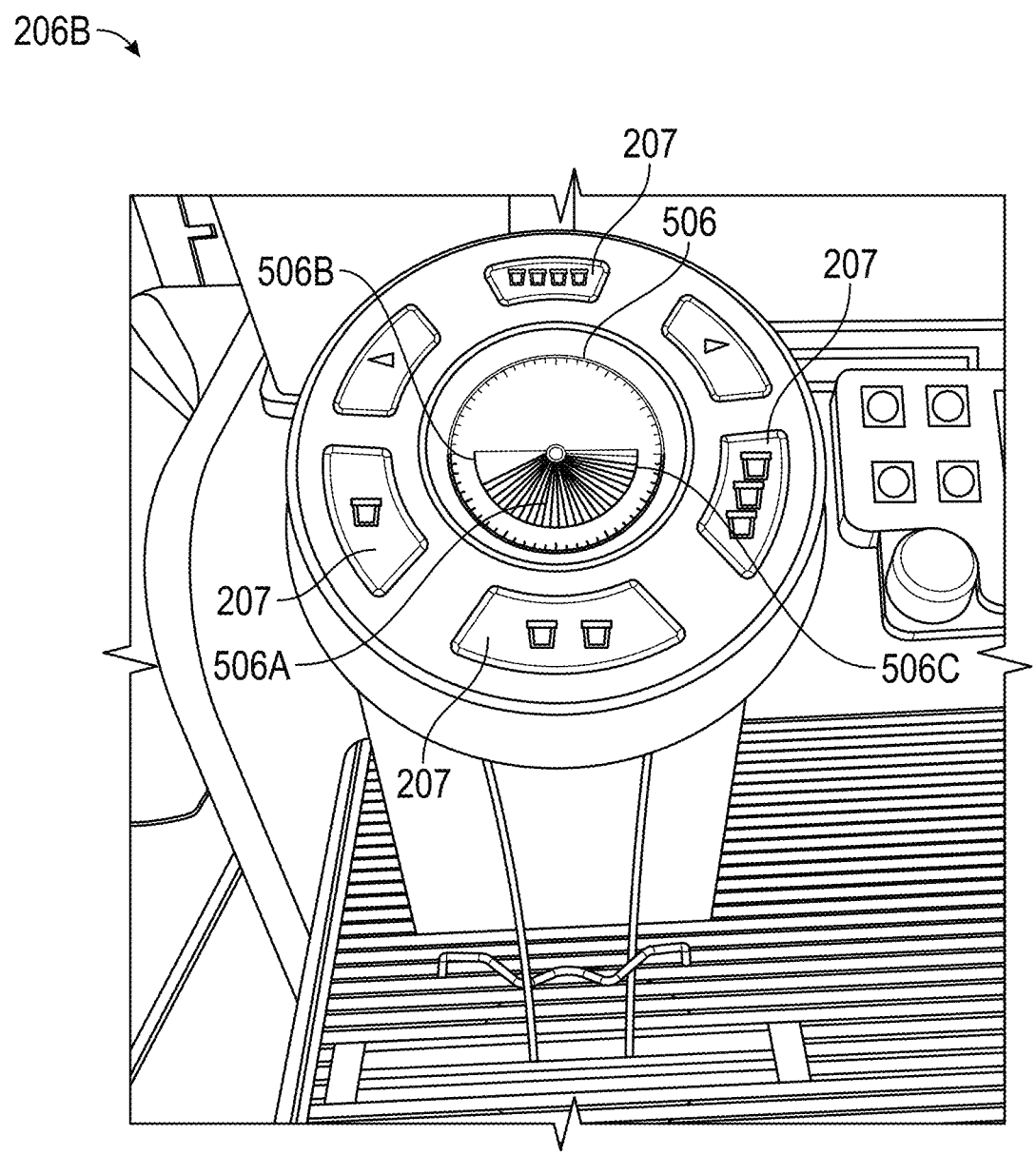

In some embodiments, the user interface 206 may include a first user interface 206A, as shown in FIGS. 4A and 4B, and/or a second user interface 206B, as shown in FIGS. 5A and 5B. In some embodiments, the first user interface 206A may be configured to display a graphical representation of the beverage queue 300. The first user interface 206A may be configured to display a graphical representation of the first beverage queue 300A and the second beverage queue 300B. The first user interface 206A may be configured to display a number of doses 303 of each beverage component 302 of the first beverage queue 300A and/or the second beverage queue 300B, and/or a type 404 of each beverage component 302 (e.g., espresso). The first user interface 206A may be configured to display a beverage component status 406 (i.e., a progress bar) of each beverage component 302. The first user interface 206A may be configured to display an indication of a quality 408 of each beverage component 304.

In some embodiments, the first user interface 206A may be configured to display an indication of the dispensing point 108 a beverage component 302 will be dispensed from and/or the dispensing point 108 the beverage component 302 is currently being dispensed from so a user can place a beverage container at the correct dispensing point 108 for each beverage component 302.

In some embodiments, the first user interface 206A may be configured to display an indication 410 which beverage ingredient is in each of the first hopper 102A, the second hopper 102B, and the third hopper 102C.

In some embodiments, the second user interface 206B may be configured to display a second beverage component status 506. The second beverage component status 506 may include a progress bar that may indicate progress or completion of the preparation of beverage components 302 and/or progress or completion of the dispensing of beverage components 302. In some embodiments, the second user interface 206B may include a circle shape, and a bottom portion of the circle shape may include the second beverage component status 506. The second beverage component status 506 may be empty at the start of preparing the beverage component 302. The beverage component status 506 may fill in from a center 506A of the beverage component status 506. A first portion 506B of the beverage component status 506 may fill in to indicate progress or completion of the preparation and/or dispensing of beverage components 302 prepared with the first brew chamber 106A and/or dispensed via the first dispensing point 108A. A second portion 506C of the beverage components status 506 may fill in to indicate progress or completion of the preparation and/or dispensing of beverage components 302 prepared with the second brew chamber 106B and/or dispensed via the second dispensing point 108B.

In some embodiments, the second interface 206B may include the user inputs 207. The user inputs 207 may be configured to receive a user selection to prepare and/or dispense a particular number of doses 303 of a beverage component 302 so the user may manually select beverage components to prepare via the system 100. In some embodiments, the second user interface 206B may transmit the user selection to the controller 204. The controller 204 may add the beverage component 302 of the user selection to the queue 300 as described above, or the controller 204 may add the beverage component 302 of the user selection to a front of the queue 300.

In some embodiments, one or more functions, features, and/or components of the system 100 and/or the control system 200 may be added or retrofit to the system 10 or beverage dispensing machine (i.e., a coffee maker or espresso maker) that includes the system 10. The system 10 or beverage dispensing machine that includes the system 10 may only prepare beverage components with one brew chamber 16, as described above with reference to FIG. 1A. The system 10 or beverage dispensing machine that include the system 10 may be modified to include one or more functions, features, and/or components of the system 100 and/or the control system 200.

In some embodiments, the system 10 may be modified to include the flow restrictors 111 of the system 100. In some embodiments, a connection between the boiler system 19 and the brew chambers 16 of the system 10 may be modified to include a connection between the boiler system 109 and the brew chamber 106 of the system 100, so the boiler system 19 of the system 10 may provide the extraction medium to both the first brew chamber 16A and the second brew chamber 16B at the same In some embodiments, a second expansion chamber 112B may be added to the system 10 so the system 10 can control the pressure of the extraction medium provided to the first brew chamber 16A and the second brew chamber 16B. In some embodiments, the system 10 may be modified to include the flow restrictors 111 of the system 100. In some embodiments, the system 10 may be modified so the dispensing point 18 may include the first dispensing point 108A and the second dispensing point 108B. In some embodiments, the system 10 may be modified to include the valve 114 of the system 100. In some embodiments, a size one or more orifices, openings, or holes of the boiler system 19, the brew chambers 16 and/or other parts or components of the system 10 or the beverage dispensing machine that includes the system 10 may be modified (i.e., increased or decreased) to manage or control the pressure of the extraction medium provided to the first brew chamber 16A and the second brew chamber 16B. In some embodiments, the system 10 may be modified to include an expansion valve of the system 100 so the system 10 may maintain or limit the pressure of the extraction medium in the system 10.

By modifying the system 10 or the beverage dispensing machine that includes the system 10 to include one or more functions, features, and/or components of the system 100 and/or the control system 200, a time required to prepare beverage components and/or beverage orders may be decreased or reduced. The system 10 or beverage dispensing machine modified to include one more functions, features, and/or components of the system 100 and/or the control system 200 may increase beverage throughput of the brewing system or beverage dispensing machine. For example, the system 100 may prepare two beverage components at the same time, one in each of the first brew chamber 106A and the second brew chamber 106B instead of only the first brew chamber 106A or the second chamber 106B, which can double throughput of the beverage dispensing machine.

In some embodiments, parts or components of the beverage dispensing machine of other than the system 10 may be modified. The beverage dispensing machine may include a steam wand 22 configured to dispense steam (e.g., water) at a pressure in order to heat, steam, and/or froth secondary beverage components (e.g., milk, almond milk, creamer, etc.). In some embodiments, a diameter 24 of the steam wand 22 may be increased so the steam wand 22 can heat, steam, and/or froth secondary beverage components at a faster rate so the steam wand 22 may not be a bottle neck for beverage throughput. In some embodiments, the steam wand 22 may be replaced with a second steam wand 122 that includes a diameter 124 larger than the diameter 24 of the steam wand 22. In some embodiments, the pressure of the steam may be increased so the steam wand 22, 122 can heat, steam, and/or froth secondary beverage components at a faster rate.

In some embodiments, a kit may include the flow restrictors 111, the valve 114, the flow meters 208, and/or other parts or components of a beverage dispensing machine, for example, a steam wand 122. In some embodiments, the kit may be configured to modify one or more functions, features, and/or components of the system 10 to include one or more functions, features, and/or components of system 100, as described above.

In some embodiments, the beverage dispensing machine may include a power source. The power source may include a battery (e.g., rechargeable battery or replaceable battery), an inductive power source, and/or a wired connection to an outlet. In some embodiments, a size or power throughput of the power source may be increased so the beverage dispensing machine receives sufficient power to operate the system 100 and/or control system 200.

Although the system 100 is described above as including a first hopper 102A, a second hopper 102B, and a third hopper 102C, in some embodiments, the system 100 may include one (1) hopper 102, two (2) hoppers 102, three (3) hoppers 102, four (4) hoppers 102, five (5) hoppers 102, six (6) hoppers 102, seven (7) hoppers 102, eight (8) hoppers 102, (9) hoppers 102, and/or ten (10) hoppers 102. In some embodiments, the system 100 may include more than ten (10) hoppers 102. In some embodiments, the system 100 may include between three (3) hoppers 102 and fifteen (10) hoppers 102. In some embodiments, the system 100 may include between three (3) hoppers 102 and five (5) hoppers 102.

Although the system 100 is described above as including a first grinder 104A, a second grinder 104B, and a third grinder 104B, in some embodiments, may include one (1) grinder 104, two (2) grinders 104, three (3) grinders 104, four (4) grinders 104, five (5) grinders 104, six (6) grinders 104, seven (7) grinders 104, eight (8) grinders 104, (9) grinders 104, and/or ten (10) grinders 104. In some embodiments, the system 100 may include more than ten (10) grinders 104. In some embodiments, the system 100 may include between three (3) grinders 104 and ten (10) grinders 104. In some embodiments, the system 100 may include between three (3) grinders 104 and five (5) grinders 104. In some embodiments, the system 100 may include a grinder 104 for each hopper 102. In some embodiments, the system 100 may include a same number of grinders 104 and hoppers 102

Although the system 100 is described above as including, a first brew chamber 106A and a second brew chamber 106B, in some embodiments, the system 100 may include one (1) brew chamber 106, two (2) brew chambers 106, three (3) brew chambers 106, four (4) brew chambers 106, five (5) brew chambers 106, six (6) brew chambers 106, seven (7) brew chambers 106, eight (8) brew chambers 106, and/or (9) brew chambers 106. In some embodiments, the system 100 may include more than nine (9) brew chambers 106. In some embodiments, the system 100 may include between two (2) brew chambers 106 and fourteen (9) brew chambers 106. In some embodiments, the system 100 may include between two (2) brew chambers 106 and four (4) brew chambers 106. In some embodiments, the system 100 may include less brew chambers 106 than hoppers 102 and/or grinders 104. In some embodiments, the system 100 may include one less brew chamber 106 than hoppers 102 and/or grinders 104.

In some embodiments, the system 100 may include a plurality of dispensing points 108. In some embodiments, the system 100 may include one (1) dispensing point 108, two (2) dispensing points 108, three (3) dispensing points 108, four (4) dispensing points 108, five (5) dispensing points 108, six (6) dispensing points 108, seven (7) dispensing points 108, eight (8) dispensing points 108, and/or (9) dispensing points 108. In some embodiments, the system 100 may include more than nine (9) dispensing points 108. In some embodiments, the system 100 may include between two (2) dispensing points 108 and nine (9) dispensing points 108. In some embodiments, the system 100 may include between two (2) dispensing points 108 and four (4) dispensing points 108. In some embodiments, the system 100 may include a same number of dispensing points 108 and brew chambers 106.

CERTAIN TERMINOLOGY

As used herein, the term "beverage" has its ordinary and customary meaning, and includes, among other things, any edible liquid or substantially liquid substance or product having a flowing quality (e.g., juices, coffee beverages, teas, milk, beer, wine, cocktails, liqueurs, spirits, cider, soft drinks, flavored water, energy drinks, soups, broths, combinations of the same, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. Numbers preceded by a term such as "about" or "approximately" include the recited numbers and should be interpreted based on the circumstances (e.g., as accurate as reasonably possible under the circumstances, for example. For example, "about 1 gram" includes "1 gram." In the embodiments described in this application, terms such as "about" or "approximately" within the specification or claims that precede values or ranges can be omitted such that this application specifically includes embodiments of the recited values or ranges with the terms "about" or "approximately" omitted from such values and ranges such that they can also be claimed without the terms "about" or "approximately" before the disclosed range. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

The following example embodiments identify some possible permutations of combinations of features disclosed herein, although other permutations of combinations of features are also possible.

SUMMARY

Although certain aspects, advantages, and features are described herein, it is not necessary that any particular embodiment include or achieve any or all of those aspects, advantages, and features. For example, some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable. In addition, although this disclosure describes certain embodiments and examples of beverage systems and methods, many aspects of the above-described systems and methods may be combined differently and/or modified to form still further embodiments or acceptable examples. All such modifications and variations are intended to be included herein within the scope of this disclosure.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. The figures are drawn to scale, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage dispensing systems and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A method for increasing throughput of a beverage dispensing machine, the method comprising the steps of:
   identifying a beverage dispensing machine comprising a beverage dispensing system, the beverage dispensing system comprising a controller, a boiler system with a first expansion chamber configured to pressurize an extraction medium, brew chambers, a connection between the boiler system and the brew chambers configured to provide a flow of the extraction medium to the brew chambers, and a dispensing point in fluid communication with the brew chambers, wherein the connection between the boiler system comprises a first flow meter, wherein the beverage dispensing system cannot simultaneously brew beverage components in two or more of the brew chambers, and
   retrofitting the beverage dispensing system of the beverage dispensing machine so the beverage dispensing system can simultaneously prepare beverage components in two or more of the brew chambers,
   wherein retrofitting the beverage dispensing system comprises:
   modifying the flow of the extraction medium through the connection between the boiler system and the brew chambers so the boiler system can provide the flow of extraction medium to two or more of the brew chambers at the same time, wherein modifying the flow of extraction medium comprises one or more of the following:
      retrofitting the connection between the boiler system and the brew chambers of the beverage dispensing system with one or more flow restrictors to maintain a pressure of the flow of extraction medium in the connection between the boiler system and the brew chambers;
      retrofitting the boiler system with a second expansion chamber, so the boiler system can provide, from the first expansion chamber, a first flow of the extraction medium through the connection to a first brew chamber of the brew chambers at a first pressure and, from the second expansion chamber, a second flow of the extraction medium through the connection to a second brew chamber of the brew chambers at a second pressure;

retrofitting the connection between the boiler system and the brew chambers with a second flow meter so the boiler system so the first flow meter measures the first flow of the extraction medium, and the second flow meter measures the second flow of the extraction medium;

retrofitting the dispensing point of the beverage dispensing system with a first dispensing point in fluid communication with a first brew chamber of the brew chambers and a second dispensing point in fluid communication with a second brew chamber of the brew chambers, and retrofitting the beverage dispensing system with a valve configured to control the first dispensing point and the second dispensing point so the beverage dispensing system can independently dispense beverage components from the first dispensing point and the second dispensing point; and modifying the controller of the beverage dispensing system so the controller is configured to independently control the first pressure of the extraction medium provided to the first brew chamber, and the second pressure of the extraction medium provided to the second brew chamber.

2. The method of claim 1, wherein the beverage dispensing machine further comprises one or more machine components, wherein the one or more machine components do not comprise the beverage dispensing system, and the method further comprises the step of:

modifying the one or more machine components to decrease a time required for the one or more machine components to perform a beverage preparation function.

3. The method of claim 2, wherein modifying the one or more machine components comprises:

increasing a diameter of a steam wand of the beverage dispensing machine, and increasing a steam pressure of the steam wand.

4. The method of claim 1, wherein the beverage dispensing machine comprises a coffee dispensing machine and/or an espresso dispensing machine.

5. A kit for increasing throughput of a beverage dispensing machine the kit comprising:

one or more components, wherein a beverage dispensing system of the beverage dispensing machine comprises a controller, a boiler system with a first expansion chamber configured to pressurize an extraction medium, brew chambers, a connection between the boiler system and the brew chambers configured to provide a flow of the extraction medium to the brew chambers, and a dispensing point in fluid communication with the brew chambers, wherein the connection between the boiler system comprises a first flow meter, wherein the beverage dispensing system cannot simultaneously brew a beverage component in two or more brew chambers of the beverage dispensing system, and wherein the beverage dispensing system is retrofitted with the one or more components so the beverage dispensing machine can simultaneously prepare beverage components in two or more of the brew chambers, wherein retrofitting the beverage dispensing system with the one or more components comprises:

modifying the flow of the extraction medium through the connection between the boiler system and the brew chambers so the boiler system can provide the flow of extraction medium to two or more of the brew chambers at the same time, wherein modifying the flow of extraction medium comprises one or more of the following:

retrofitting the connection between the boiler system and the brew chambers of the beverage dispensing system with one or more flow restrictors to maintain a pressure of the flow of extraction medium in the connection between the boiler system and the brew chambers;

retrofitting the boiler system with a second expansion chamber, so the boiler system can provide, from the first expansion chamber, a first flow of the extraction medium through the connection to a first brew chamber of the brew chambers at a first pressure and, from the second expansion chamber, a second flow of the extraction medium through the connection to a second brew chamber of the brew chambers at a second pressure;

refitting the connection between the boiler system and the brew chambers with a second flow meter so the boiler system so the first flow meter measures the first flow of the extraction medium, and the second flow meter measures the second flow of the extraction medium;

retrofitting the dispensing point of the beverage dispensing system with a first dispensing point in fluid communication with a first brew chamber of the brew chambers and a second dispensing point in fluid communication with a second brew chamber of the brew chambers, and retrofitting the beverage dispensing system with a valve configured to control the first dispensing point and the second dispensing point so the beverage dispensing system can independently dispense beverage components from the first dispensing point and the second dispensing point; and modifying the controller of the beverage dispensing system so the controller is configured to independently control the first pressure of the extraction medium provided to the first brew chamber, and the second pressure of the extraction medium provided to the second brew chamber.

6. The kit of claim 5, wherein the one or more components comprise one or more of the following: the one or more flow restrictors, the second expansion chamber, the second flow meter, and the valve.

7. The kit of claim 5, wherein the one or more components are configured to modify one or more machine components of the beverage dispensing machine to decrease a time required for the one or more machine components to perform a beverage preparation function, wherein the machine components do not comprise the beverage dispensing system.

8. The kit of claim 5, wherein the one or more components comprise a first steam wand comprising a first diameter, and the beverage dispensing machine comprises a second steam wand comprising a second diameter, wherein the first diameter is larger than the second diameter, and wherein the first steam wand is configured to replace the second steam wand, and wherein a pressure of water supplied to the first steam wand is increased from a pressure of waster supplied to the second steam wand.

* * * * *

UNITED STATES PATENT AND TRADEMARK OFFICE
CERTIFICATE OF CORRECTION

PATENT NO. : 12,053,117 B1  
APPLICATION NO. : 18/313151  
DATED : August 6, 2024  
INVENTOR(S) : Matthew D. House Page 1 of 1

It is certified that error appears in the above-identified patent and that said Letters Patent is hereby corrected as shown below:

In the Specification

Column 3, Line 2, delete "waster" and insert -- water --.

Column 11, Line 19, delete "of the of the" and insert -- of the --.

Column 13, Line 39, delete "same" and insert -- same time. --.

Column 15, Line 3, delete "102" and insert -- 102. --.

In the Claims

Column 20, Line 21 (approx.), In Claim 5, delete "refitting" and insert -- retrofitting --.

Column 20, Line 62 (approx.), In Claim 8, delete "waster" and insert -- water --.

Signed and Sealed this  
Tenth Day of December, 2024

Katherine Kelly Vidal  
*Director of the United States Patent and Trademark Office*